(12) United States Patent
Sun et al.

(10) Patent No.: US 10,986,514 B2
(45) Date of Patent: Apr. 20, 2021

(54) METHOD AND APPARATUS FOR SIGNALING USING GENERALIZED CHU SEQUENCES

(71) Applicant: QUALCOMM Incorporated, San Diego, CA (US)

(72) Inventors: Jing Sun, San Diego, CA (US); Taesang Yoo, Riverside, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/445,910

(22) Filed: Feb. 28, 2017

(65) Prior Publication Data

US 2017/0280336 A1    Sep. 28, 2017

Related U.S. Application Data

(60) Provisional application No. 62/314,103, filed on Mar. 28, 2016.

(51) Int. Cl.
*H04W 24/02* (2009.01)
*H04L 5/00* (2006.01)
(Continued)

(52) U.S. Cl.
CPC ......... *H04W 24/02* (2013.01); *H04J 11/0069* (2013.01); *H04J 13/0062* (2013.01);
(Continued)

(58) Field of Classification Search
None
See application file for complete search history.

(56) References Cited

U.S. PATENT DOCUMENTS

2007/0217530 A1\* 9/2007 Hosseinian ......... H04L 25/0228
375/260
2008/0107086 A1   5/2008 Fukuta et al.
(Continued)

FOREIGN PATENT DOCUMENTS

CN        103095613 A      5/2013
CN        101536336 B     10/2013
(Continued)

OTHER PUBLICATIONS

International Search Report and Written Opinion—PCT/US2017/020471—ISA/EPO—dated May 31, 2017.
(Continued)

*Primary Examiner* — Andre Tacdiran
(74) *Attorney, Agent, or Firm* — QUALCOMM Incorporated

(57) ABSTRACT

An eNB may determine a root for a sequence to be included in a signal to a UE. The eNB may generate a generalized Chu sequence based on the root and scramble the generalized Chu sequence using a pseudorandom sequence that is common to a plurality of eNBs. The eNB may transmit the scrambled generalized Chu sequence to indicate the beginning of a downlink transmission. The UE may receive this scrambled generalized Chu sequence and determine if a beginning of a downlink transmission from a serving eNB based on the received generalized Chu sequence and an expected generalized Chu sequence.

12 Claims, 11 Drawing Sheets

(51) Int. Cl.
*H04L 27/26* (2006.01)
*H04J 13/14* (2011.01)
*H04L 27/00* (2006.01)
*H04J 11/00* (2006.01)
*H04J 13/00* (2011.01)
*H04W 40/24* (2009.01)
*H04W 74/00* (2009.01)

(52) U.S. Cl.
CPC ............ *H04J 13/14* (2013.01); *H04L 5/0048* (2013.01); *H04L 27/0006* (2013.01); *H04L 27/261* (2013.01); *H04W 40/244* (2013.01); *H04W 74/006* (2013.01); *H04J 11/00* (2013.01); *H04L 5/001* (2013.01); *H04L 5/0007* (2013.01); *H04L 5/0023* (2013.01); *H04L 5/0053* (2013.01); *H04L 27/2628* (2013.01)

(56) References Cited

U.S. PATENT DOCUMENTS

| | | | |
|---|---|---|---|
| 2008/0205552 A1 | 8/2008 | Sartori et al. | |
| 2008/0235314 A1* | 9/2008 | Lee | H04J 13/14 708/426 |
| 2009/0046646 A1 | 2/2009 | Cho et al. | |
| 2009/0116459 A1 | 5/2009 | Do | |
| 2009/0270122 A1* | 10/2009 | Chmiel | H04J 11/0093 455/550.1 |
| 2009/0279469 A1* | 11/2009 | Wang | H04L 5/005 370/312 |
| 2009/0323642 A1* | 12/2009 | Tanno | H04B 1/7075 370/336 |
| 2010/0020905 A1* | 1/2010 | Mansour | H04J 11/00 375/343 |
| 2011/0019694 A1 | 1/2011 | Kwon et al. | |
| 2013/0021986 A1 | 1/2013 | Bhattad et al. | |
| 2013/0242951 A1* | 9/2013 | Lee | H04W 56/001 370/336 |
| 2013/0266088 A1* | 10/2013 | Kim | H04L 5/0048 375/296 |
| 2013/0301434 A1 | 11/2013 | Krishnamurthy et al. | |
| 2013/0301542 A1 | 11/2013 | Krishnamurthy et al. | |
| 2014/0029521 A1 | 1/2014 | Puthenpura et al. | |
| 2014/0293988 A1* | 10/2014 | Han | H04L 5/0051 370/344 |
| 2015/0110066 A1* | 4/2015 | Gaal | H04W 16/14 370/330 |
| 2015/0304056 A1* | 10/2015 | Guo | H04L 25/00 455/63.1 |
| 2015/0341586 A1* | 11/2015 | Allison, III | H04N 5/40 348/724 |
| 2015/0373652 A1* | 12/2015 | Dabeer | H04W 52/241 455/522 |
| 2016/0057731 A1* | 2/2016 | Damnjanovic | H04W 68/025 455/458 |
| 2016/0212721 A1* | 7/2016 | Sheng | H04W 76/14 |
| 2016/0218821 A1* | 7/2016 | Adhikary | H04J 11/0069 |
| 2016/0278031 A1* | 9/2016 | Sorrentino | H04W 56/003 |
| 2016/0294499 A1* | 10/2016 | Ogawa | H04J 13/0062 |
| 2016/0345347 A1* | 11/2016 | Cheng | H04L 5/001 |
| 2017/0245165 A1* | 8/2017 | Onggosanusi | H04L 5/0057 |
| 2018/0131481 A1* | 5/2018 | Jiang | H04L 27/2607 |
| 2018/0248680 A1* | 8/2018 | Ji | H04W 56/00 |
| 2018/0309611 A1* | 10/2018 | Ko | H04J 11/0073 |

FOREIGN PATENT DOCUMENTS

| | | |
|---|---|---|
| CN | 104285466 A | 1/2015 |
| CN | 104380830 A | 2/2015 |
| EP | 2207270 A1 | 7/2010 |
| WO | 2008094014 A2 | 8/2008 |
| WO | 2014205723 A1 | 12/2014 |
| WO | 2015116732 A1 | 8/2015 |

OTHER PUBLICATIONS

Motorola: "Updated Proposal for 3GPP2 Phase II Air Interface Evolution", 3GPP2 Draft; C30-20060626-048-MOT-Updated Framework Proposal, 3rd Generation Partnership Project 2, 3GPP2, 2500 Wilson Boulevard, Suite 300, Arlington, Virginia 22201; USA, vol. TSGC Jun. 27, 2006 (Jun. 27, 2006), pp. 1-113, XP062204971, Retrieved from the Internet: URL: http://ftp.3gpp2.org/TSGC/Working/2006/2006-06-MiyazakiJapan/TSG-C-2006-06-Miyazaki-Japan/WG3/ [retrieved on Jun. 27, 2006].

* cited by examiner

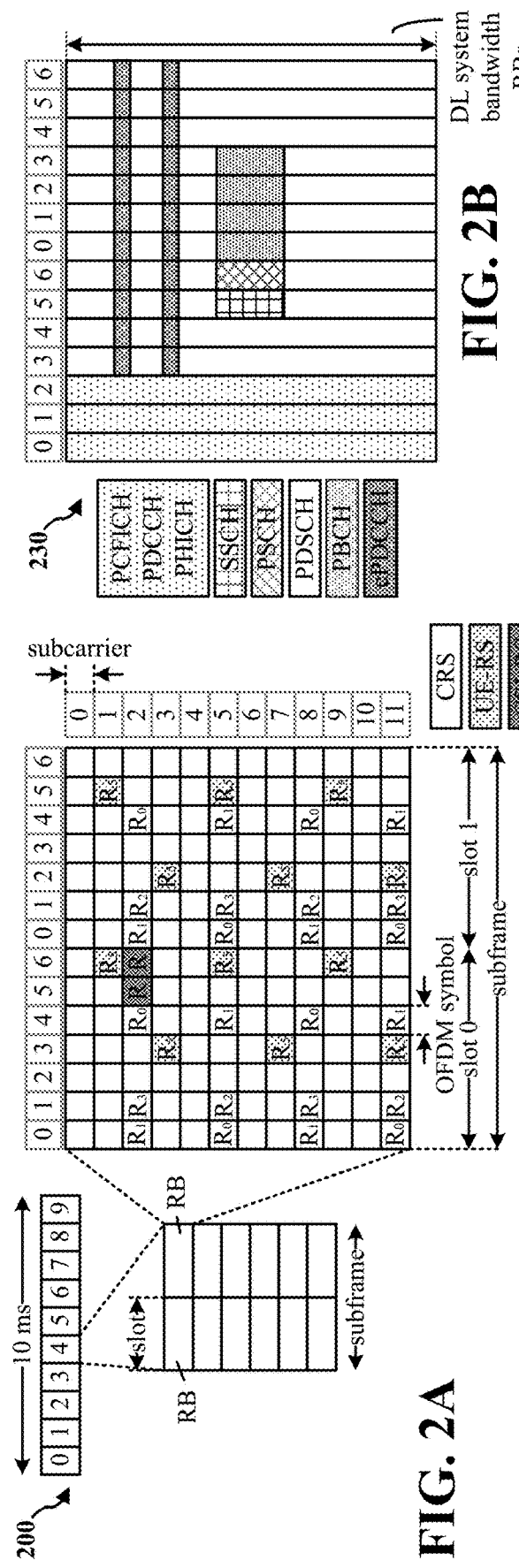
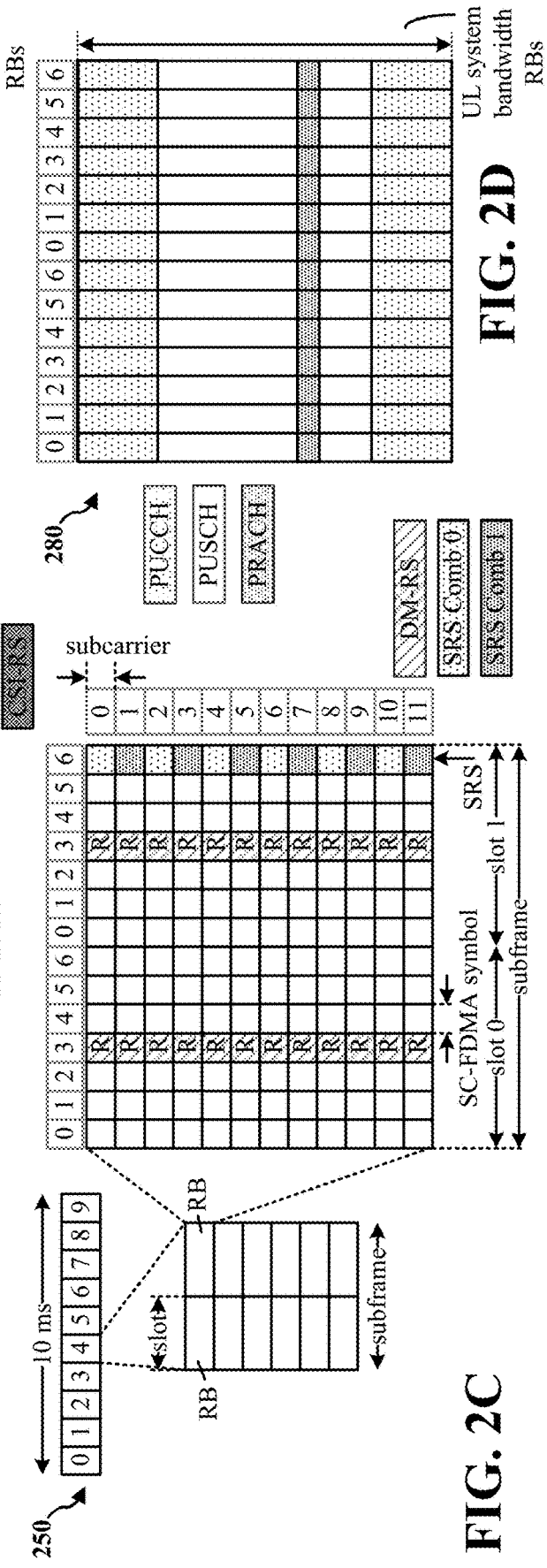
FIG. 2A  FIG. 2B  FIG. 2C  FIG. 2D

METHOD AND APPARATUS FOR SIGNALING USING GENERALIZED CHU SEQUENCES

CROSS-REFERENCE TO RELATED APPLICATION(S)

This application claims the benefit of U.S. Provisional Application Ser. No. 62/314,103, entitled "METHOD AND APPARATUS FOR SIGNALING USING GENERALIZED CHU SEQUENCES" and filed on Mar. 28, 2016, which is expressly incorporated by reference herein in its entirety.

BACKGROUND

Field

The present disclosure relates generally to communication systems, and more particularly, to communication between an evolved node B and a user equipment using generalized Chu sequences to detect signals.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, an evolved node B (eNB) may perform a listen-before-talk procedure, such as clear channel assessment, before transmission of a downlink waveform. Accordingly, downlink communication from an eNB to a user equipment (UE) may occur in bursts. The eNB may indicate the beginning of a burst by including a sequence in a signal intended for the UE. By detecting a sequence, the UE may determine the beginning of a downlink transmission from the eNB, which may be serving the UE.

According to various aspects, an eNB may determine a root for a sequence to be transmitted over the air. The eNB may generate a generalized Chu sequence based on the root and scramble the generalized Chu sequence using a pseudorandom sequence that is common to a plurality of eNBs. The eNB may transmit the scrambled generalized Chu sequence to indicate the beginning of a data burst. The UE may receive this scrambled generalized Chu sequence and descramble the generalized Chu sequence. The UE may multiply this descrambled generalized Chu sequence with a conjugated expected generalized Chu sequence and convert the product to the frequency domain. Therefrom, the UE may determine a beginning of a data burst.

In an aspect of the disclosure, a method, a computer-readable medium, and an apparatus are provided. The apparatus may be configured to determine a root. The apparatus may be further configured to generate a generalized Chu sequence based on the determined root. The apparatus may be further configured to scramble the generalized Chu sequence using a pseudorandom sequence that is common to a plurality of eNBs. The apparatus may be further configured to transmit the scrambled generalized Chu sequence.

In another aspect of the disclosure, another method, another computer-readable medium and another apparatus are provided. The other apparatus may be configured to receive a first sequence over the air. The other apparatus may be further configured to generate a generalized Chu sequence. The other apparatus may be further configured to determine whether the first sequence indicates a beginning of a downlink transmission from a serving eNB based on the first sequence and the generalized Chu sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
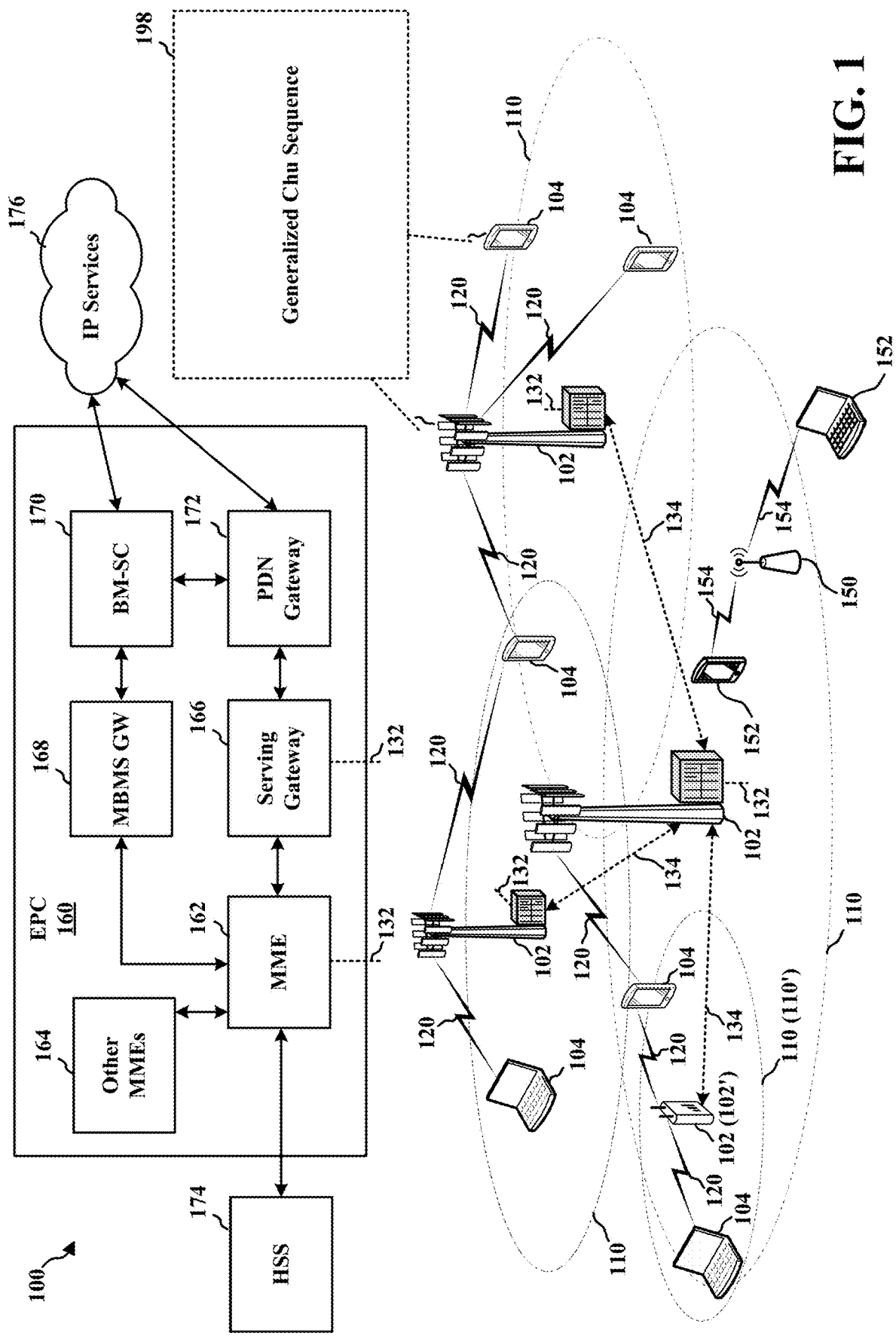
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., ×2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in an unlicensed frequency spectrum (e.g., 5 GHz). When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to transmit, to the UE 104, a generalized Chu sequence 198. The generalized Chu sequence 198 may indicate, to the UE 104, the beginning of a downlink transmission from the eNB 102 intended for the UE 104, such as when the eNB 102 is serving the UE 104.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
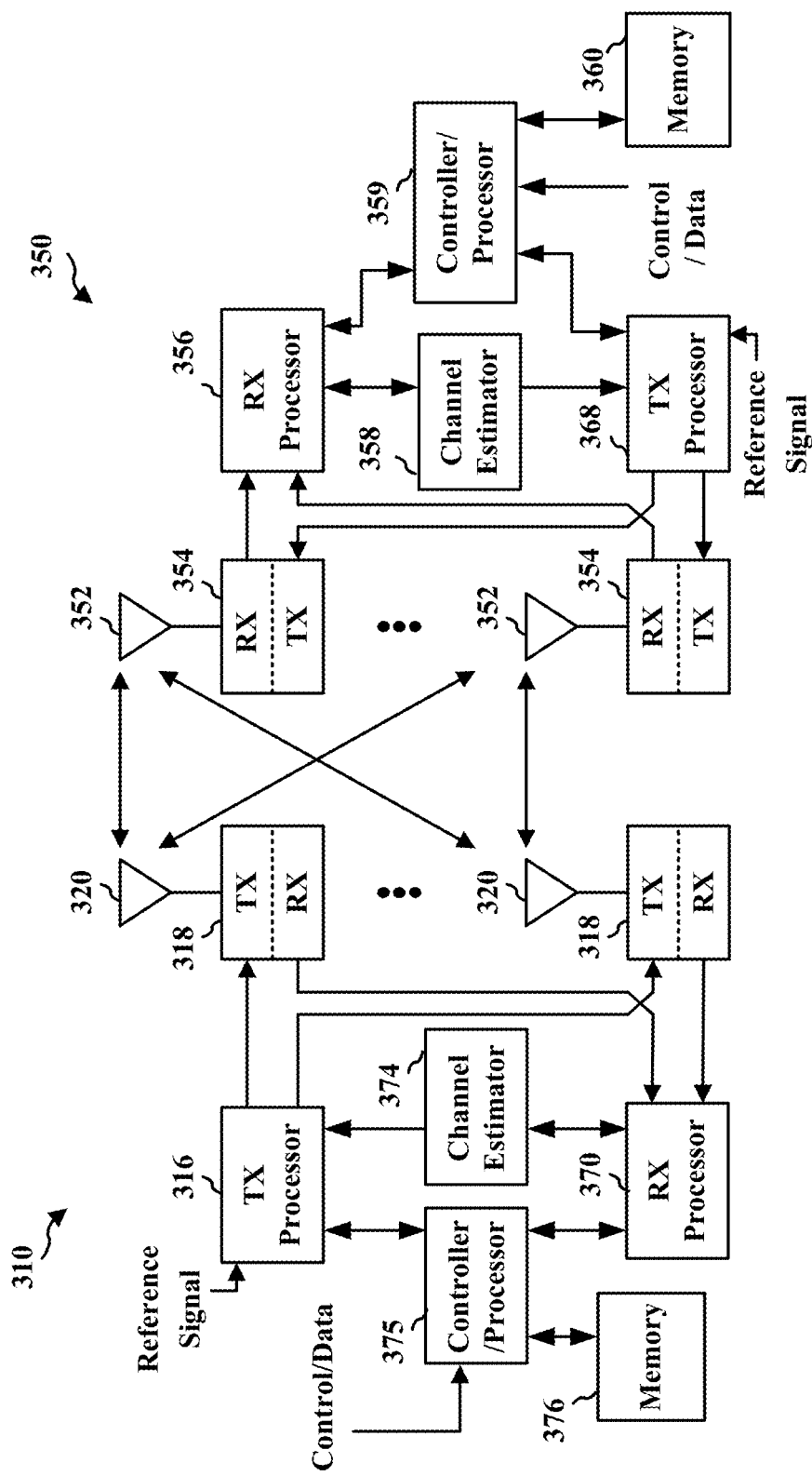
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
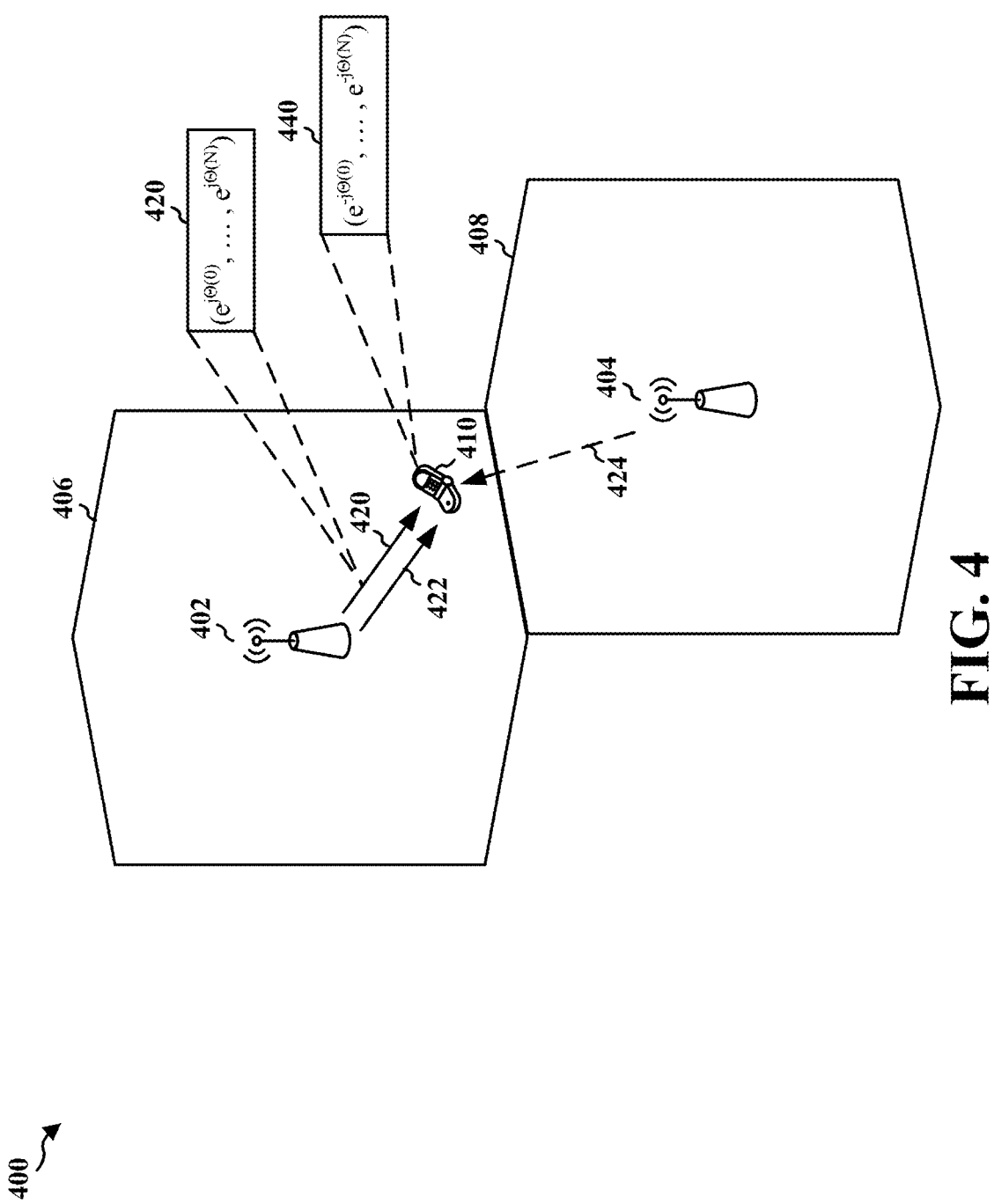
FIG. 4 is a diagram of a wireless communications system.

FIG. 4 is a diagram of a wireless communications system 400. The wireless communications system 400 includes a plurality of eNBs 402, 404, each configured to provide a respective cell 406, 408. The wireless communications system 400 further includes at least one UE 410. The UE 410 is configured to receive service in a serving cell 406 provided by a serving eNB 402. The serving eNB 402 may be an aspect of the eNB 102 of FIG. 1 and/or an aspect of the eNB 310 of FIG. 3. The UE 410 may be an aspect of the UE 104 of FIG. 1 and/or the UE 350 of FIG. 3.

In various aspects, the eNBs 402, 404 and the UE 410 may operate in conformance with one or more standards, such as LTE or other similar standard (e.g., one or more standards defined in one or more technical specifications promulgated by 3GPP). In one aspect, the eNBs 402, 404 and the UE 410 may be configured to communicate in an unlicensed spectrum, such as the five (5) gigahertz (GHz) band used by dual-band Wi-Fi equipment. Communication in an unlicensed spectrum may adhere to LTE and may be known as LTE-U. In one aspect, the serving eNB 402 and the UE 410 may communicate using a wide band carrier. For example, the serving eNB 402 may transmit downlink signals to the UE 410 on a component carrier that is greater than twenty megahertz (MHz), which may be known as an enhanced component carrier (eCC). In one aspect, the eCC may have a bandwidth of approximately eighty (80) MHz.

According to various aspects, the serving eNB 402 may perform a listen-before-talk (LBT) procedure in order to contend for access to a band, such as an unlicensed band utilized according to LTE-U. The LBT procedure performed by the serving eNB 402 may include a clear channel assessment (CCA) to determine whether a channel of a band is available. When the serving eNB 402 determines that the channel of the band is available, the serving eNB 402 may reserve the channel for a downlink transmission and/or uplink transmission over the channel. Because a plurality of devices may contend in the same band, such as a band for LTE-U and/or a band for eCC, communication may be discontinuous. For example, communication between the serving eNB 402 and the UE 410 may occur in bursts. In one aspect, a channel usage beacon signal (CUBS) and/or a cell-specific reference signal (CRS) may indicate the beginning of a downlink burst.

In an aspect, another eNB 404 may transmit a transmission 424 that interferes with transmissions from the serving eNB 402 at the UE 410. If a gold sequence (or gold code) is used to distinguish between signals in cells 406, 408, the UE 410 may experience a higher probability of a false alarm from the interfering transmission 424. That is, the UE 410 may incorrectly determine that the interfering transmission 424 is from the serving eNB 402 when a gold sequence is used as a CUBS/CRS to detect the start of a data burst. False alarms may occur when the UE 410 detects transmissions intended for the UE 410 due to interfering transmissions from a non-serving eNB using a different gold sequence because the product of two gold sequences (from descrambling) is another gold sequence and a gold sequence (truncated) has a relatively poor autocorrelation property (e.g., a worse autocorrelation property than random quadrature phase shift keying (QPSK)).

To reduce the probability of false alarms, in an aspect, a generalized Chu sequence (e.g., a generalized Zadoff-Chu sequence) may be used to distinguish transmissions from each of the cells 406, 408. For example, the serving eNB 402 and the other eNB 404 may each use respective generalized Chu sequences to enable the UE 410 to distinguish the transmissions of each eNB. Generalized Chu sequences may have relatively favorable properties in comparison to other pseudorandom sequences, such as a gold sequence. For example, generalized Chu sequences may have favorable autocorrelation properties and, further, the product of two generalized Chu sequences is another generalized Chu sequence but possibly with a different root. Additionally, the time-domain waveform of a generalized Chu sequence may uniformly distribute energy over an entire range (e.g., 0 to 250 tones).

In various aspects, a generalized Chu sequence may be defined as $X(n) = e^{-j\pi un(n+1)/N}$, where N is equal to the length of the generalized Chu sequence, $n = 0, N-1$, and u is the root of the generalized Chu sequence. If N is prime, the generalized Chu sequence may have the property that the amplitude is fixed in the time domain. In some aspects, u is not required to be co-prime with N. That is, any u may be suitable as the root of the generalized Chu sequence. For example, an odd value for u may yield a generalized Chu sequence in which energy is well distributed in the time domain. However, some u values may yield undesirable properties, such as a relatively high peak-to-average power ratio (PAPR), and so may be avoided (although not necessarily, for example, if common scrambling is used on top of the generalized Chu sequence)—e.g., u values that are 0 or N/2 may be avoided. Additionally, a greatest common divisor of u and N that is too large, may yield an undesirable energy distribution, e.g., too few spikes which may adversely impact detection at a receiver (e.g., the UE 410). The number of spikes in the time domain sequence may be equal to N divided by the greatest common divisor of u and N. In one aspect u may be 24, N may be 256 which results in a greatest common divisor of 8 and 32 spikes in the time domain sequence which enables the detection of the generalized Chu sequence from the serving eNB with reduced false alarms or missed detection of serving eNB transmissions.

In various aspects, the eNBs 402, 404 may each use a respective generalized Chu sequence to indicate a respective start of a respective downlink transmission. For example, a generalized Chu sequence may be used as a CUBS/CRS. In various aspects, a length of a generalized Chu sequence may be 256. For example, in an aspect, 256 tones with a 78.125 kilohertz (KHz) tone spacing may be utilized for a 20 MHz spectrum bandwidth, and the same number of 256 tones and tone spacing may be utilized for each twenty (20) MHz bandwidth of spectrum. To mitigate false alarms at a receiver (e.g., the UE 410), the generalized Chu sequence may be scrambled using a common sequence that is known to a plurality of eNBs, including the serving eNB 402 and the other eNB 404. That is, the serving eNB 402 and the other eNB 404 may each use a different respective generalized Chu sequence as a respective CUBS/CRS, but both the serving eNB 402 and the other eNB 404 may scramble their respective generalized Chu sequences with the same common sequence. The common sequence may be a pseudorandom sequence, such as a gold sequence. Usage of a common scrambling sequence may mitigate issues (e.g., false alarms) associated with some aforementioned u values that may be undesirable (e.g., usage of common scrambling may mitigate issues associated with relatively high PAPR caused by usage of some u values).

In aspects, the serving eNB 402 may have a downlink burst to transmit to the UE 410. A CUBS/CRS may indicate the start of a downlink burst from the serving eNB 402. The serving eNB 402 may determine a root for a generalized Chu sequence. In aspects, the root may be a function of at least an identifier (ID) of the cell 406 provided by the serving eNB 402 and/or a slot index associated with downlink communication in the serving cell 406. Additionally, the serving eNB 402 may apply some randomization to avoid frequently selecting the same root (e.g., so that two eNBs may be less likely to select a same root). The serving eNB 402 may generate a generalized Chu sequence 420 based on the determined root. In one aspect, the serving eNB 402 may generate a generalized Chu sequence 420 according to the equation $X(n)=e^{-j\pi un(n+1)/N}$, where N is equal to the length of the generalized Chu sequence (e.g., 256), n=0, . . . , N−1, and u is the determined root.

In aspects, the serving eNB 402 may scramble the generalized Chu sequence 420 using a pseudorandom sequence that is common to the serving eNB 402 and the other eNB 404 (e.g., a gold sequence known to both eNBs 402, 404).

In aspects, the serving eNB 402 may use the generalized Chu sequence 420 (scrambled using the common pseudorandom sequence) as a CUBS/CRS. The serving eNB 402 may then transmit the generalized Chu sequence 420. In some aspects, the generalized Chu sequence 420 may be used as a CUBS/CRS to indicate the beginning of a downlink transmission 422 (e.g., data burst) from the serving eNB 402.

In various aspects, the UE 410 may be configured to detect whether a CUBS/CRS indicates the beginning of a downlink transmission from a serving eNB based on a generalized Chu sequence used as the CUBS/CRS. When the UE 410 is served by a serving cell 406, the UE 410 may be configured to generate an expected generalized Chu sequence—that is, a generalized Chu sequence that the UE 410 expects to receive from the serving eNB 402—in order to determine whether a received CUBS/CRS indicates the start of a downlink transmission from the serving eNB 402. The UE 410 may be configured to determine a root, which may be associated with the serving cell 406. The UE 410 may determine the root based on at least one of an ID of the serving cell 406 and/or a slot index associated with the serving cell 406. In one aspect, the UE 410 may receive information indicating one or more of the ID of the serving cell 406, the slot index, and/or the root from the serving eNB 402, such as in an information block (e.g., a System Information Block (SIB), a Master Information Block (MIB), or the like).

Based on the determined root, the UE 410 may be configured to generate a generalized Chu sequence that is expected from the serving eNB 402 to indicate the start of a downlink transmission from the serving eNB 402. In one aspect, the UE 410 may generate the expected generalized Chu sequence according to the equation $X(n)=e^{-j\pi un(n+1)/N}$, where N is equal to the length of the generalized Chu sequence (e.g., 256), n=0, . . . , N−1, and u is the determined root. In one aspect, the UE 410 may generate an expected generalized Chu sequence that is the same as the generalized Chu sequence 420 transmitted by the serving eNB 402.

In aspects, the UE 410 may receive the generalized Chu sequence 420, used as a CUBS/CRS, and decode the scrambled generalized Chu sequence 420. The UE 410 may descramble the scrambled generalized Chu sequence 420 using the pseudorandom sequence that is common to the eNBs 402, 404. The UE 410 may be configured to determine whether the generalized Chu sequence 420 indicates the beginning of a downlink transmission from the serving eNB 402 based on the descrambled generalized Chu sequence 420 and the expected generalized Chu sequence.

According to aspects, the UE 410 may conjugate the expected generalized Chu sequence to obtain the conjugate 440 of the expected generalized Chu sequence. The UE 410 may multiply the generalized Chu sequence 420, received as the CUBS/CRS from the serving eNB 402, with the conjugated generalized Chu sequence 440. This multiplication may be an element-wise operation and the product may be a third sequence. In one aspect, the third sequence may be composed of all one (1) values when the received generalized Chu sequence 420 matches the expected generalized Chu sequence.

According to aspects, the UE 410 may apply an inverse fast Fourier transform (IFFT) to the third sequence. Application of the IFFT to the third sequence may result in a fourth sequence, and the fourth sequence may be in the time domain.

From the fourth sequence in the time domain, the UE 410 may determine whether the generalized Chu sequence 420 indicates the beginning of a downlink transmission from the serving eNB 402. If the UE 410 determines that the received generalized Chu sequence 420 indicates the beginning of a downlink transmission from the serving eNB 402, the UE 410 may decode the downlink transmission 422 from the serving eNB 402. If the UE 410 determines that a received generalized Chu sequence does not indicate the beginning of a downlink transmission from the serving eNB 402, the UE 410 may ignore the signal—e.g., the UE 410 may ignore the interfering transmission 424 because the interfering transmission 424 is not preceded by a generalized Chu sequence 420 for the serving eNB 402.

In one aspect, the UE 410 may determine that the fourth sequence indicates the beginning of a downlink transmission from the serving eNB 402 based on tap energy in a signal window and tap energy in a noise window. The signal window and the noise window may correspond to different portions of the fourth sequence. In one aspect, the UE 410 may determine that the signal window corresponds to a first portion of the fourth sequence, and the UE 410 may determine that the noise window corresponds to a second portion of the fourth sequence, wherein the second portion excludes the first portion. For example, the signal window may correspond to a first quarter or range of (0, 0.2) time domain samples of the fourth sequence, whereas the noise window may correspond to a remaining three quarters or range of (0.3, 0.99) time domain samples of the fourth sequence.

In one aspect, the UE 410 may determine a first tap energy from the signal window and, further, may determine a second tap energy from the noise window. In one aspect, the first tap energy may be the maximum tap energy in the signal window and the second tap energy may be the maximum tap energy in the noise window (e.g., a maximum tap energy may be a highest tap energy of at least one tap in the signal or noise window). In another aspect, the first tap energy may be the maximum tap energy in the signal window and the second tap energy may be the mean tap energy in the noise window. The UE 410 may divide the first tap energy from the signal window by the second tap energy from the noise window. The UE 410 may compare this quotient to a threshold to determine whether the received generalized Chu sequence 420 indicates the beginning of a downlink transmission from the serving eNB 402. For example, if the quotient meets or exceeds a threshold, then the UE 410 may determine that the received generalized Chu sequence 420 indicates the beginning of a downlink transmission from the serving eNB 402. In one aspect, the threshold may be a predetermined value, such as two (2).

Figure 5:
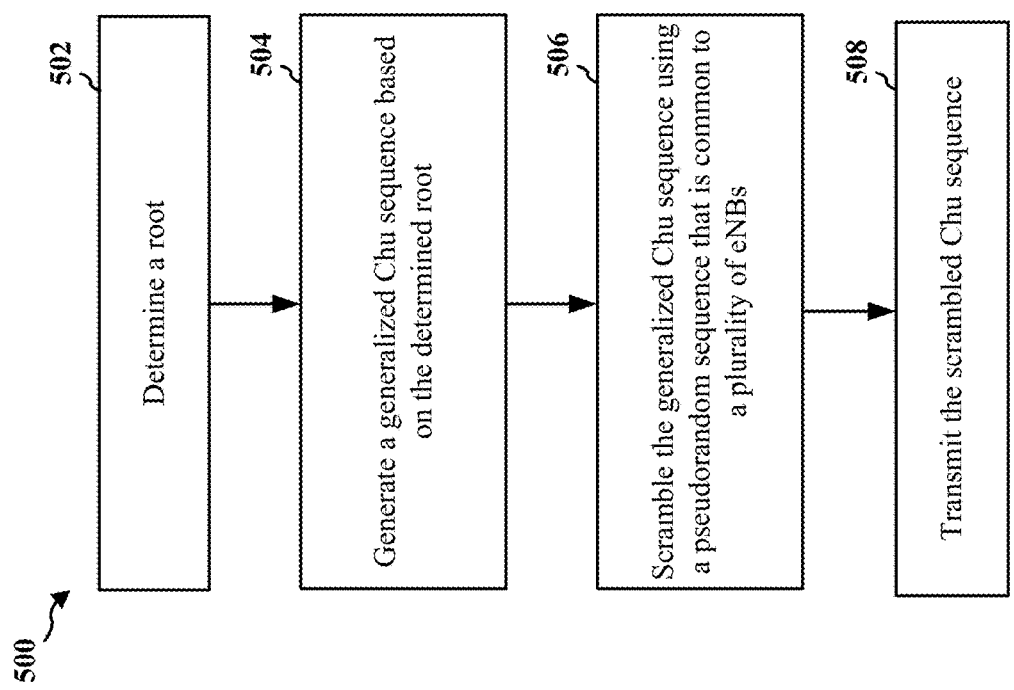
FIG. 5 is a flowchart of a method of wireless communication for an eNB.

Now with reference to FIG. 5, a flowchart illustrates a method 500 of wireless communication for an eNB. The method 500 may be performed by an eNB, such as the serving eNB 402 of FIG. 4.

In FIG. 5, various operations may be illustrated as optional (e.g., denoted by dashed lines). However, the present disclosure contemplates operations in which one or more operations of the method 500 are optional, omitted, and/or alternatively performed according to various aspects. Further, one or more operations of the method 500 may be transposed and/or contemporaneously performed.

The method 500 may begin with an operation 502, at which an eNB may determine a root. For example, the eNB may identify a value (e.g., an ID of a cell provided by the eNB and/or a slot index associated with communication by the eNB), and the eNB may identify a root that corresponds to the identified value. In various aspects, the root may be based on an ID of a cell provided by the eNB and/or a slot index associated with downlink communication by the eNB. In the context of FIG. 4, the serving eNB 402 may determine a root (e.g., the serving eNB 402 may access a lookup table index by at least one of the cell ID or the slot index to determine a root).

At operation 504, the eNB may generate a generalized Chu sequence based on the determined root. For example, the eNB may determine the root and then apply an equation to the determined root. The eNB may generate the generalized Chu sequence according to the equation $X(n) = e^{-j\pi u n(n+1)/N}$, where N is equal to a length of the generalized Chu sequence (e.g., 256), n=0, ..., N−1, and u is the determined root. In the context of FIG. 4, the serving eNB 402 may generate the generalized Chu sequence 420.

At operation 506, the eNB may scramble the generalized Chu sequence using a pseudorandom sequence that is common to a plurality of eNBs. For example, the eNB may identify a pseudorandom sequence that is common to a plurality of eNBs, and then the eNB may scramble (e.g., encode) the generalized Chu sequence using the identified pseudorandom sequence. In one aspect, the pseudorandom sequence may be a gold sequence or gold code. In one aspect, the common pseudorandom sequence may be provided to the eNB by a core network. In the context of FIG. 4, the serving eNB 402 may scramble the generalized Chu sequence 420 using a pseudorandom sequence that is common to the serving eNB 402 and the other eNB 404.

At operation 508, the eNB may transmit the generalized Chu sequence. In aspects, the generalized Chu sequence may indicate the beginning of a downlink transmission from the eNB to a receiver. In aspects, the generalized Chu sequence may be used as a CUBS or CRS. In the context of FIG. 4, the serving eNB 402 may transmit the generalized Chu sequence 420. The serving eNB 402 may use the generalized Chu sequence 420 as a CUBS or CRS. The generalized Chu sequence 420 may indicate the beginning of the downlink transmission 422.

Figure 6:
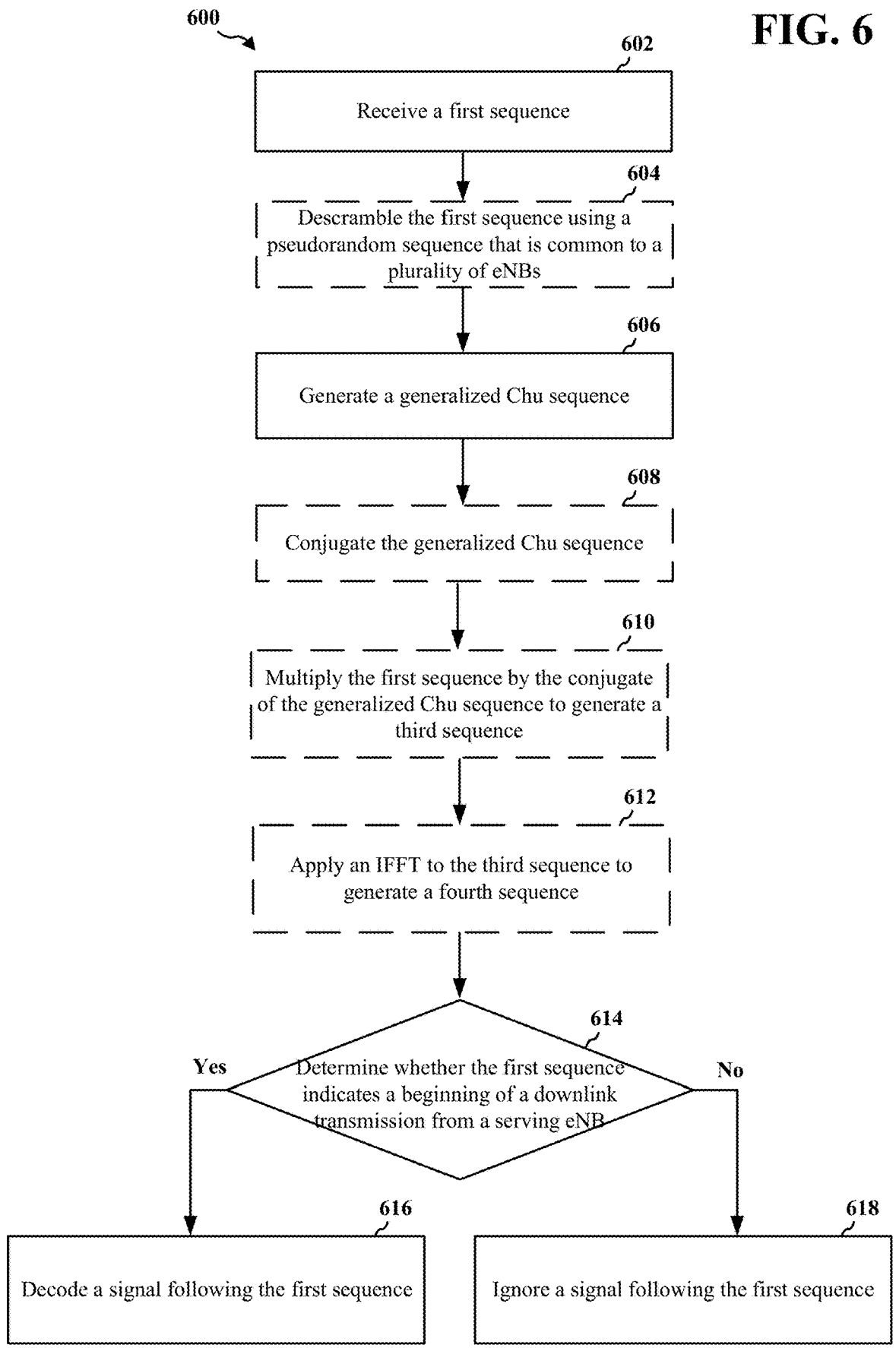
FIG. 6 is a flowchart of a method of wireless communication for a UE.

Turning to FIG. 6, a flowchart illustrates a method 600 of wireless communication for a UE. The method 600 may be performed by a UE, such as the UE 410 of FIG. 4.

In FIG. 6, various operations may be illustrated as optional (e.g., denoted by dashed lines). However, the present disclosure contemplates operations in which one or more operations of the method 600 are optional, omitted, and/or alternatively performed according to various aspects. Further, one or more operations of the method 600 may be transposed and/or contemporaneously performed.

At operation 602, the UE may receive a first sequence over the air. The first sequence may be a CUBS or CRS. In the context of FIG. 4, the UE 410 may receive the generalized Chu sequence 420 from the serving eNB 402.

In some aspects, the received first sequence may be scrambled, for example, using a pseudorandom sequence (e.g., a gold sequence or gold code) that is common to a plurality of eNBs. Thus, at operation 604, the UE may descramble the first sequence using the pseudorandom sequence that is common to a plurality of eNBs. For example, the UE may identify a pseudorandom sequence (e.g., a pseudorandom sequence that is common to a plurality of eNBs), and then the UE may descramble (e.g., decode) the first sequence using the identified pseudorandom sequence. In the context of FIG. 4, the UE 410 may descramble the generalized Chu sequence 420 using a pseudorandom sequence that is common to both the serving eNB 402 and the other eNB 404.

At operation 606, the UE may generate a generalized Chu sequence that is expected from an eNB serving the UE. In an aspect, the UE may generate the expected generalized Chu sequence based on a root. The UE may determine the root based on at least one of an ID of a cell serving the UE and/or a slot index associated with downlink communication from the eNB serving the UE (e.g., the UE may access a lookup table and determine a root using the cell ID and/or the slot ID as a key(s) for the lookup table). In the context of FIG. 4, the UE 410 may generate an expected generalized Chu sequence based on a determined root. In an aspect, the expected generalized Chu sequence may match the generalized Chu sequence 420 transmitted by the serving eNB 402.

At operation 608, the UE may conjugate the expected generalized Chu sequence. For example, the UE may identify the expected generalized Chu sequence, and the UE may conjugate the expected generalized Chu sequence. In the context of FIG. 4, the UE 410 may obtain the conjugate 440 by conjugating the expected generalized Chu sequence.

At operation 610, the UE may multiply the received first sequence by the conjugate of the expected generalized Chu sequence. In an aspect, this multiplication may be an element-wise operation, the product of which may be a third sequence. In one aspect, the third sequence may be a sequence of all one (1) values, such as when the first sequence matches the expected generalized Chu sequence. In the context of FIG. 4, the UE 410 may multiply the conjugate 440 of the expected generalized Chu sequence by the received generalized Chu sequence 420 to obtain a third sequence.

At operation 612, the UE may apply an IFFT to the third sequence to generate a fourth sequence, and the fourth sequence may be in the frequency domain. In the context of FIG. 4, the UE 410 may generate a fourth sequence by application of an IFFT to a third sequence that is the product of the conjugate 440 of the expected generalized Chu sequence and the received generalized Chu sequence 420.

At operation 614, the UE may determine whether the first sequence indicates the beginning of a downlink transmission from an eNB serving the UE. The UE may determine whether the first sequence indicates the beginning of a downlink transmission from the eNB serving the UE based on the fourth sequence.

Because the fourth sequence may be generated based on the received first sequence and the expected generalized Chu sequence, the UE may determine whether the first sequence indicates the beginning of a downlink transmission from the eNB serving the UE based on both the first sequence and the expected generalized Chu sequence. In the context of FIG. 4, the UE 410 may determine whether the received generalized Chu sequence 420 indicates the beginning of a downlink transmission from the serving eNB 402.

If the UE determines that the first sequence indicates the beginning of a downlink transmission from an eNB serving the UE, the UE may decode a downlink transmission following the first sequence, as illustrated at operation 616. In the context of FIG. 4, the UE 410 may decode the downlink transmission 422.

Alternatively, the UE may ignore a downlink transmission that follows the first sequence if the UE determines that the first sequence does not indicate the beginning of a downlink transmission from an eNB serving the UE, as illustrated at operation 618. In the context of FIG. 4, the UE 410 may ignore the interfering transmission 424 because the interfering transmission 424 is not preceded by a generalized Chu sequence from the eNB 402 serving the UE 410.

Figure 7:
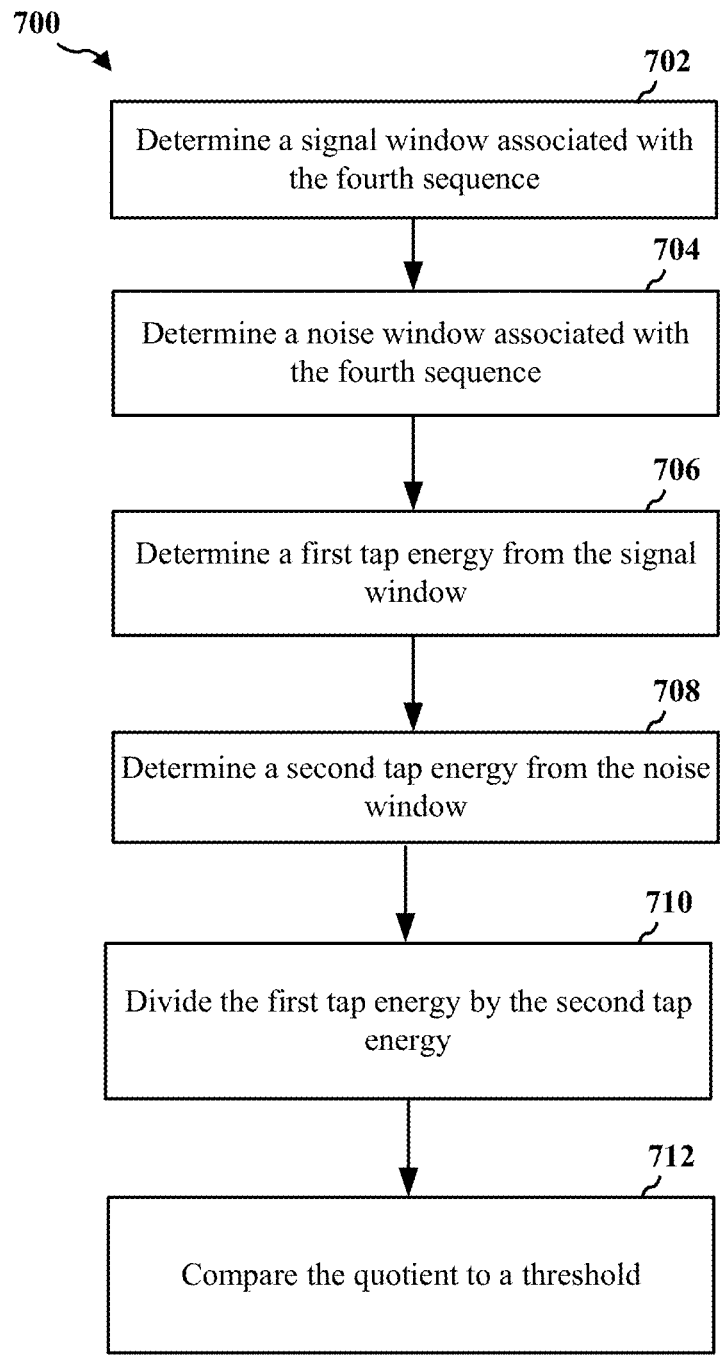
FIG. 7 is a flowchart of a method of determining whether a sequence indicates a beginning of a downlink transmission from a serving eNB.

With reference to FIG. 7, a flowchart illustrates a method 700 of determining whether a first sequence indicates the beginning of a downlink transmission from a serving eNB based on a fourth sequence. The method 700 may be an aspect of operation 614 of FIG. 6 and may be performed by a UE, such as the UE 410 of FIG. 4.

In FIG. 7, various operations may be illustrated as optional (e.g., denoted by dashed lines). However, the present disclosure contemplates operations in which one or more operations of the method 700 are optional, omitted, and/or alternatively performed according to various aspects. Further, one or more operations of the method 700 may be transposed and/or contemporaneously performed.

The method 700 describes various operations in relation to a fourth sequence. As described with reference to FIG. 6, the fourth sequence may be in the frequency domain and may be the result of application of an IFFT to a third sequence, wherein the third sequence is a product of a received generalized Chu sequence and a conjugate of an expected generalized Chu sequence.

At operation 702, the UE may determine a signal window for the fourth sequence. In one aspect, the signal window corresponds to a first portion of the fourth sequence. For example, the signal window may correspond to a first quarter or range of (0, 0.2) samples of the fourth sequence. For example, the UE may determine a signal window by identifying a range of values and then selecting a signal window that corresponds to the range of values.

In the context of FIG. 4, the UE 410 may determine the signal window from a fourth sequence. In the context of FIG. 4, the fourth sequence may be the result of application of an IFFT to a third sequence, wherein the third sequence is a product of the received generalized Chu sequence 420 and the conjugate 440 of an expected generalized Chu sequence.

At operation 704, the UE may determine a noise window for the fourth sequence. In one aspect, the noise window corresponds to a second portion of the fourth sequence, wherein the second portion excludes the first portion. For example, the noise window may correspond to a remaining three quarters or range of (0.3, 0.99) time domain samples of the fourth sequence. For example, the UE may determine a noise window by identifying a range of values and then selecting a noise window that corresponds to the range of values. In the context of FIG. 4, the UE 410 may determine the noise window from the fourth sequence.

At operation 706, the UE may determine a first tap energy from the signal window. For example, the UE may identify a signal window and then determine the tap energy in the signal window. In one aspect, the UE may determine that the first tap energy is the maximum tap energy in the signal window. In the context of FIG. 4, the UE 410 may determine a first tap energy from the signal window of the fourth sequence.

At operation 708, the UE may determine a second tap energy from the noise window. For example, the UE may identify a signal window and then determine the tap energy in the signal window. In one aspect, the UE may determine that the second tap energy is the maximum tap energy in the noise window. In another aspect, the UE may determine that the second tap energy is a mean tap energy in the noise window. In the context of FIG. 4, the UE 410 may determine a second tap energy from the signal window of the fourth sequence.

At operation 710, the UE may divide the first tap energy by the second tap energy. In the context of FIG. 4, the UE 410 may divide the first tap energy by second tap energy.

At operation 712, the UE may compare the quotient of the first tap energy divided by the second tap energy to a threshold. In the context of FIG. 4, the UE 410 may compare the quotient of the first tap energy divided by the second tap energy to a threshold (e.g., a value stored at the UE 410).

According to various aspects, if the quotient meets or exceeds the threshold, the UE may determine that the first sequence indicates the beginning of a downlink transmission from an eNB serving the UE, and the UE may perform operation 616 of FIG. 6. Alternatively, if the quotient does not meet or exceed the threshold, the UE may determine that the first sequence does not indicate the beginning of downlink transmission from an eNB serving the UE, and the UE may perform operation 618 of FIG. 6.

Figure 8:
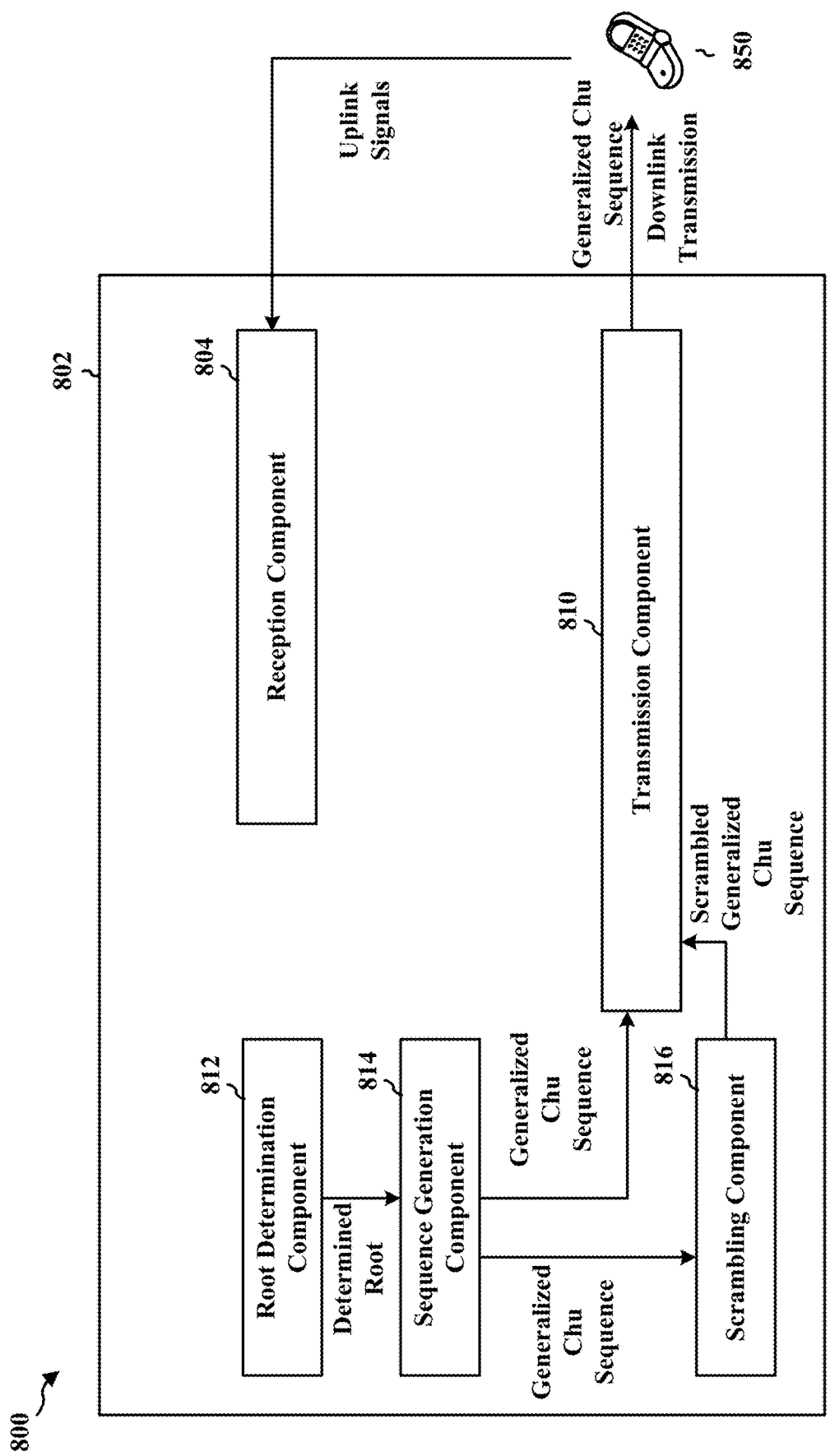
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be an eNB, such as the serving eNB 402 of FIG. 4. The apparatus 802 depicts exemplary connections and/or data between different modules/means/components. It is to be understood that such connections and/or data flow are to be regarded in as illustrative and, therefore, different and/or additional connections and/or data flow may be present in different aspects.

The apparatus 802 includes a reception component 804 that may receive uplink signals from a UE (e.g., the UE 850). The apparatus 802 further includes a transmission component 810 that may transmit downlink signals to a UE (e.g., the UE 850). The transmission component 810 may be configured to transmit a CUBS or CRS to indicate the start of a downlink transmission. A generalized Chu sequence may be used as the CUBS or CRS.

In an aspect, the apparatus 802 includes a root determination component 812 that is configured to determine a root. In various aspects, the root determination component 812 may determine the root based on at least one of an ID of a cell provided by the apparatus 802 and/or a slot index associated with downlink transmission from the apparatus 802. The root determination component 812 may provide the determined root to a sequence generation component 814.

The apparatus 802 may include sequence generation component 814 that may be configured to generate a generalized Chu sequence based on the determined root. In one aspect, the sequence generation component 814 may be configured to generate the generalized Chu sequence according to the equation $X(n)=e^{-j\pi un(n+1)/N}$, where N is equal to a length of the generalized Chu sequence (e.g., 256), n=0, . . . , N−1, and u is the determined root.

In one aspect, the sequence generation component 814 may provide the generalized Chu sequence to a scrambling component 816. In another aspect, the sequence generation component 814 may provide the generalized Chu sequence to the transmission component 810.

The scrambling component 816 may be configured to scramble the generalized Chu sequence using a pseudorandom sequence, e.g., a gold sequence. The pseudorandom sequence may be common to a plurality of other apparatuses (e.g., a plurality of eNBs), including the apparatus 802. The scrambling component 816 may be configured to provide the scrambled generalized Chu sequence to the transmission component 810.

The transmission component 810 may be configured to use the generalized Chu sequence as a CUBS or CRS to indicate the beginning of a downlink transmission (e.g., to the UE 850). In one aspect, the transmission component 810 may transmit the generalized Chu sequence. In another aspect, the transmission component 810 may transmit the scrambled generalized Chu sequence.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
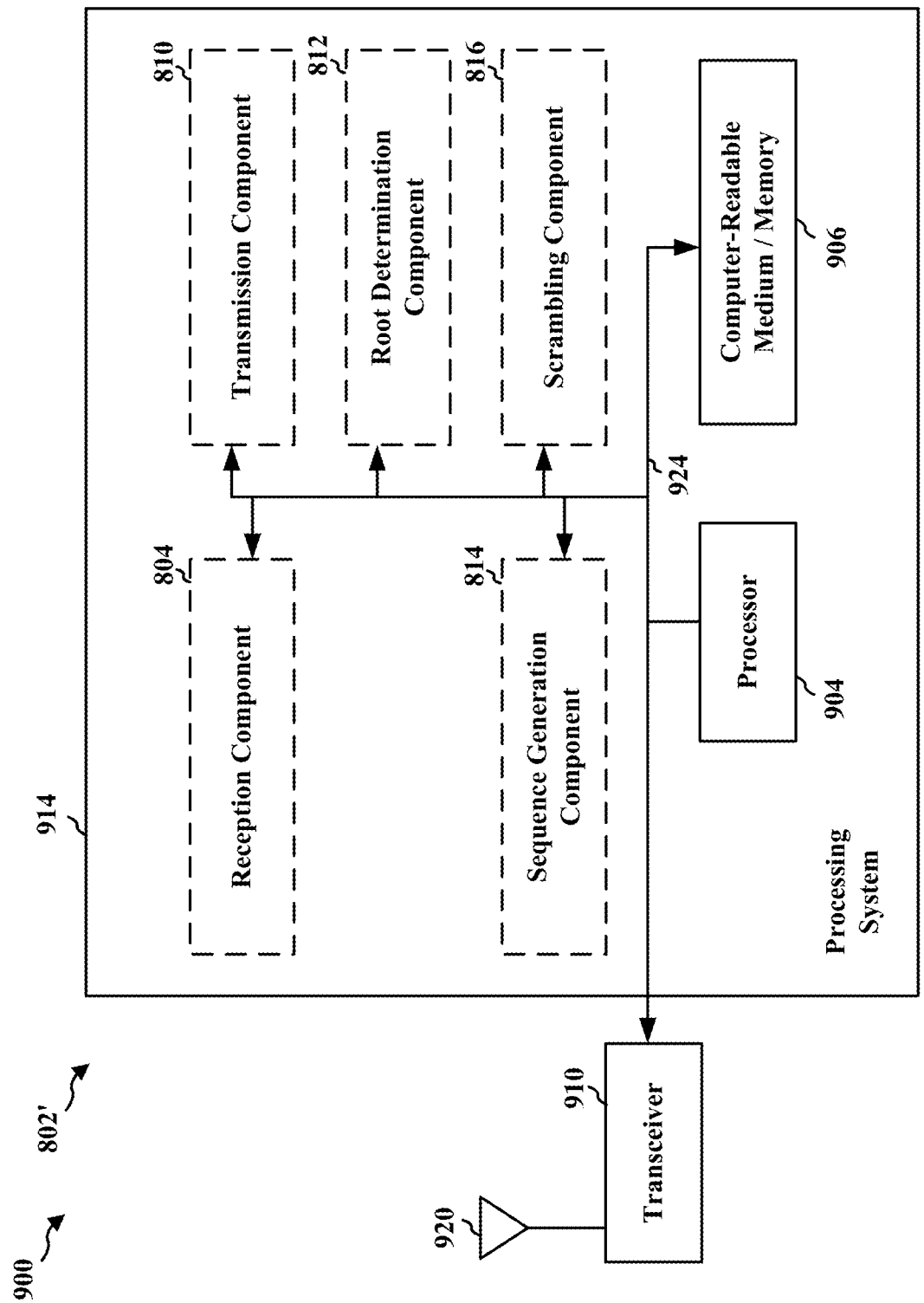
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 810, 812, 814, 816, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 810, 812, 814, 816. The components may be software components running in the processor 904, resident/stored in the computer readable medium/memory 906, one or more hardware components coupled to the processor 904, or some combination thereof. The processing system 914 may be a component of the eNB 310 and may include the memory 376 and/or at least one of the TX processor 316, the RX processor 370, and the controller/processor 375.

In one configuration, the apparatus 802/802' for wireless communication includes means for determining a root. The apparatus 802/802' may further include means for generating a generalized Chu sequence based on the determined root. The apparatus 802/802' may further include means for scrambling the generalized Chu sequence using a pseudorandom sequence that is common to a plurality of eNBs. The apparatus 802/802' may further include means for transmitting the scrambled generalized Chu sequence. In an aspect, the means for determining the root is configured to determine the root based on at least one of a cell ID and a slot index. In an aspect, the generalized Chu sequence is defined as $X(n)=e^{\wedge}(-j\pi un(n+1)/N)$, wherein N is a length of the Chu sequence, n=0, . . . , N−1, and u is the root. In an aspect, u is not co-prime with N. In an aspect, a length of the generalized Chu sequence is 256. In an aspect, the scrambled generalized Chu sequence is used as cell-specific reference signal or channel usage beacon signal. In an aspect, the pseudorandom sequence is a gold sequence.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
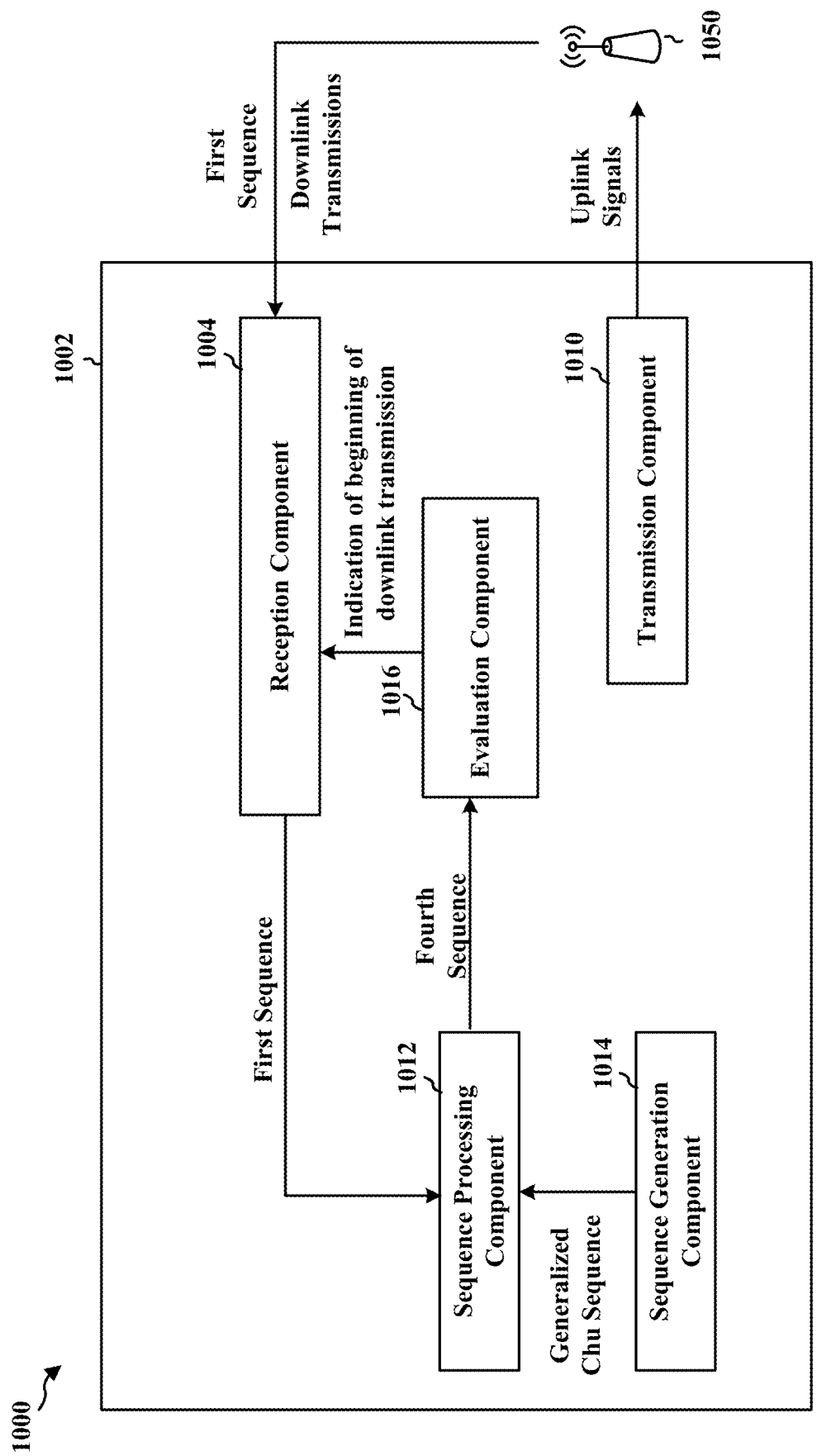
FIG. 10 is a conceptual data flow diagram illustrating the data flow between different means/components in another exemplary apparatus.

FIG. 10 is a conceptual data flow diagram 1000 illustrating the data flow between different means/components in an exemplary apparatus 1002. The apparatus may be a UE, such as the UE 410 of FIG. 4. The apparatus 1002 depicts exemplary connections and/or data between different modules/means/components. It is to be understood that such connections and/or data flow are to be regarded in as illustrative and, therefore, different and/or additional connections and/or data flow may be present in different aspects.

The apparatus 1002 includes a reception component 1004 that may receive downlink transmissions from an eNB (e.g., the eNB 1050). The apparatus 1002 further includes a transmission component 1010 that may transmit uplink signals to an eNB (e.g., the eNB 1050). The reception component 1004 may be configured to receive a first sequence over the air. In one aspect, the first sequence may be a generalized Chu sequence that is used as the CUBS or CRS to indicate the beginning of a downlink transmission from a serving eNB (e.g., the eNB 1050).

In an aspect, the apparatus 1002 includes a sequence generation component 1014. The sequence generation component 1014 may be configured to generate a generalized Chu sequence that is expected from an eNB serving the apparatus 1002 (e.g., the eNB 1050). In an aspect, the sequence generation component 1014 may be configured to determine a root. In an aspect, the root may be determined based on at least one of a cell ID (e.g., an ID of a cell provided by the eNB 1050) and/or a slot index. In an aspect, the root may be determined based on information signaled to the apparatus 1002 from the eNB 1050 serving the apparatus 1002 and received through the reception component 1004. In an aspect, the sequence generation component may be configured to generate the expected generalized Chu sequence according to the equation $X(n)=e^{-j\pi un(n+1)/N}$, where N is equal to a length of the generalized Chu sequence (e.g., 256), n=0, ..., N−1, and u is the determined root. In an aspect, the sequence generation component 1014 may provide the expected generalized Chu sequence to a sequence processing component 1012.

The apparatus 1002 may include the sequence processing component 1012 that may receive the expected generalized Chu sequence from the sequence generation component 1014 and, further, may receive the first sequence from the reception component 1004. In an aspect, the sequence processing component 1012 may be configured to conjugate the expected generalized Chu sequence. The sequence processing component 1012 may be configured to multiply the conjugate of the expected generalized Chu sequence with the first sequence. This multiplication may be an element-wise multiplication. The product may be a third sequence. In one aspect, the third sequence may be a sequence of one (1) values when the first sequence matches the expected generalized Chu sequence.

In an aspect, the sequence processing component 1012 may be configured to apply an IFFT to the third sequence. Application of an IFFT to the third sequence may generate a fourth sequence in the time domain. The sequence processing component 1012 may be configured to provide the fourth sequence to an evaluation component 1016.

The evaluation component 1016 may be configured to determine whether the first sequence indicates the start of a downlink transmission from a serving eNB (e.g., the eNB 1050) based on the fourth sequence. In an aspect, the evaluation component 1016 may determine that the fourth sequence indicates the beginning of a downlink transmission from a serving eNB based on tap energy in a signal window and tap energy in a noise window. In one aspect, the evaluation component 1016 may determine that the signal window corresponds to a first portion of the fourth sequence, and the evaluation component 1016 may determine that the noise window corresponds to a second portion of the fourth sequence, wherein the second portion excludes the first portion. For example, the signal window may correspond to a first quarter or range of (0, 0.2) of the fourth sequence, whereas the noise window may correspond to a remaining three quarters or range of (0.3, 0.99) of the fourth sequence.

In one aspect, the evaluation component 1016 may determine a first tap energy from the signal window and, further, may determine a second tap energy from the noise window. In one aspect, the first tap energy may be the maximum tap energy in the signal window and the second tap energy may be the maximum tap energy in the noise window. In another aspect, the first tap energy may be the maximum tap energy in the signal window and the second tap energy may be the mean tap energy in the noise window. The evaluation component 1016 may divide the first tap energy from the signal window by the second tap energy from the noise window. The evaluation component 1016 may compare this quotient to a threshold to determine whether the received first sequence indicates the beginning of a downlink transmission from a serving eNB. For example, if the quotient meets or exceeds a threshold, then the evaluation component 1016 may determine that the received first sequence indicates the beginning of a downlink transmission from a serving eNB. The evaluation component 1016 may be configured to indicate, to the reception component 1004, that the first sequence indicates a beginning of a downlink transmission from a serving eNB. In response, the reception component 1004 may sample a downlink transmission from the eNB 1050 for decoding.

In an aspect, the apparatus 1002 includes a sequence processing component 1012 that is configured to determine a root. In various aspects, the sequence processing 1012 may determine the root based on at least one of an ID of a cell provided by the apparatus 1002 and/or a slot index associated with downlink transmission from the apparatus 1002. The sequence processing component 1012 may provide the determined root to a sequence generation component 1014.

The sequence generation component 1014 may be configured to generate a generalized Chu sequence based on the determined root. In one aspect, the sequence generation component 1014 may be configured to generate the generalized Chu sequence according to the equation $X(n)=e^{-j\pi un(n+1)/N}$, where N is equal to a length of the generalized Chu sequence (e.g., 256), n=0, ..., N−1, and u is the determined root.

In one aspect, the sequence generation component 1014 may provide the generalized Chu sequence to a scrambling component 1016. In another aspect, the sequence generation component 1014 may provide the generalized Chu sequence to the transmission component 1010.

The scrambling component 1016 may be configured to scramble the generalized Chu sequence using a pseudorandom sequence. The pseudorandom sequence may be common to a plurality of other apparatuses (e.g., a plurality of eNBs), including the apparatus 1002. The scrambling component 1016 may be configured to provide the scrambled generalized Chu sequence to the transmission component 1010.

The transmission component 1010 may be configured to use the generalized Chu sequence as a CUBS or CRS to indicate the beginning of a downlink transmission (e.g., to the UE 1050). In one aspect, the transmission component 1010 may transmit the generalized Chu sequence. In another aspect, the transmission component 1010 may transmit the scrambled generalized Chu sequence.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
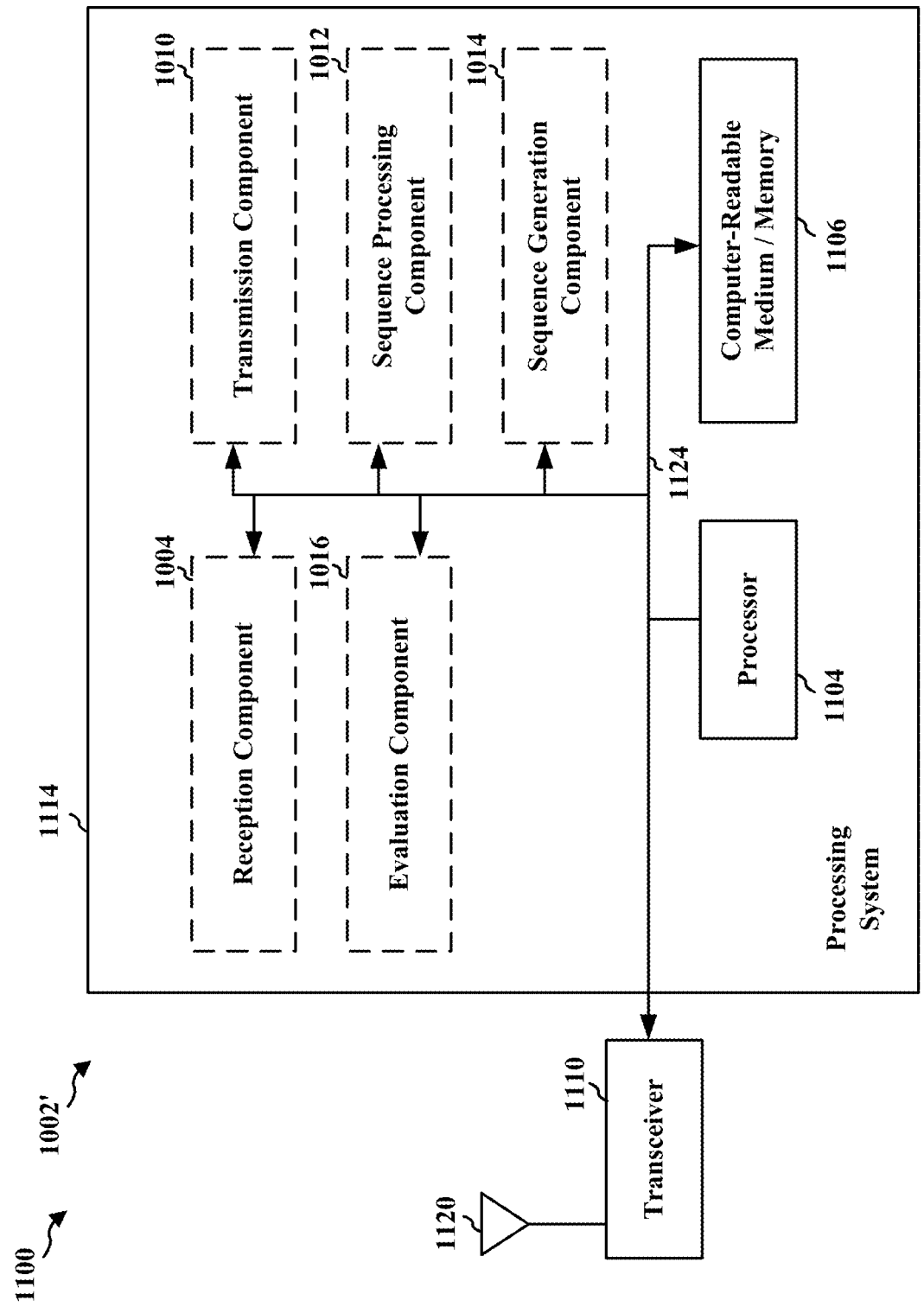
FIG. 11 is a diagram illustrating an example of a hardware implementation for another apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for means for receiving a first sequence over the air. The apparatus 1002/1002' further includes means for generating a generalized Chu sequence that is expected to be transmitted from a serving eNB. The apparatus 1002/1002' further includes means for determining whether the first sequence indicates a beginning of a downlink transmission from the serving eNB based on the first sequence and the generalized Chu sequence. In an aspect, the means for determining whether the first sequence indicates the beginning of the downlink transmission from the serving eNB based on the first sequence and the generalized Chu sequence is configured to conjugate the generalized Chu sequence; multiply the first sequence by the conjugate of the generalized Chu sequence to generate a third sequence; apply an inverse fast Fourier transform (IFFT) to the third sequence to generate a fourth sequence; and determine whether the first sequence indicates the beginning of the downlink transmission from the serving eNB based on the fourth sequence. In an aspect, the means for determining whether the first sequence indicates the beginning of the downlink transmission from the serving eNB based on the fourth sequence is configured to determine a signal window associated with the fourth sequence; determine a noise window associated with the fourth sequence; determine a first maximum tap energy in the signal window; determine a second maximum tap energy in the noise window; and compare a quotient of the first maximum tap energy divided by the second maximum tap energy to a threshold. In an aspect, the signal window is determined to be a first portion of the fourth sequence, and wherein the noise window is determined to be a second portion of the fourth sequence, the second portion excluding the first portion. In an aspect, the generalized Chu sequence is generated based on at least one of a root, a cell ID, and a slot index associated with a serving cell. In an aspect, the apparatus 1002/1002' further includes means for descrambling the first sequence using a pseudorandom sequence that is common to a plurality of eNBs. In an aspect, the pseudorandom sequence is a gold sequence. In an aspect, a length of the generalized Chu sequence is 256. In an aspect, the means for receiving the first sequence is configured to receive the first sequence as one of a cell-specific reference signal or a channel usage beacon signal that includes the first sequence.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, the method comprising:
   determining a first root;
   generating a generalized Chu sequence based on the determined first root;
   scrambling the generalized Chu sequence with a pseudorandom sequence
   generating, based on the scrambled generalized Chu sequence, a channel usage beacon signal (CUBS) that provides an indication of a start of a downlink communication from the base station to a user equipment (UE); and
   transmitting the CUBS to the UE,
   wherein another base station in an adjacent cell to the base station transmits a Chu sequence that is scrambled using the pseudorandom sequence and generated based on a second root different from the first root, and
   wherein determining the first root comprises determining the first root is different from the second root.

2. The method of claim 1, wherein the first root is determined based on at least one of a cell identifier (ID) and a slot index.

3. The method of claim 1, wherein generalized Chu sequence is defined as $X(n)=e^{-j^u n(n+1)/N}$, wherein N is a length of the Chu sequence, $n=0, \ldots, N-1$, and u is the root.

4. The method of claim 3, wherein u is not co-prime with N.

5. The method of claim 1, wherein a length of the generalized Chu sequence is 256.

6. The method of claim 1, wherein the pseudorandom sequence is a gold sequence.

7. A base station, comprising:
   means for determining a first root;
   means for generating a generalized Chu sequence based on the determined first root;
   means for scrambling the generalized Chu sequence with a pseudorandom sequence;
   means for generating, based on the scrambled generalized Chu sequence, a channel usage beacon signal (CUBS) that provides an indication of a start of a downlink communication from the base station to a user equipment (UE); and
   means for transmitting the CUBS to the UE,
   wherein another base station in an adjacent cell to the base station transmits a Chu sequence that is scrambled using the pseudorandom sequence and generated based on a second root different from the first root, and
   wherein the means for determining the first root is configured to determine the first root is different from the second root.

8. The base station of claim 7, wherein the means for determining the first root is configured to determine the first root based on at least one of a cell identifier (ID) and a slot index.

9. The base station of claim 7, wherein generalized Chu sequence is defined as $X(n)=e^{-jn(n+1)/N}$, wherein N is a length of the Chu sequence, $n=0, \ldots, N-1$, and u is the root.

10. The base station of claim 9, wherein u is not co-prime with N.

11. The base station of claim 7, wherein a length of the generalized Chu sequence is 256.

12. The base station of claim 7, wherein the pseudorandom sequence is a gold sequence.

* * * * *